United States Patent

[11] 3,616,854

| [72] | Inventors | William B. Braden, Jr.<br>Houston;<br>Joseph C. Allen, Bellaire, both of Tex. |
|---|---|---|
| [21] | Appl. No. | 872,625 |
| [22] | Filed | Oct. 30, 1969 |
| [45] | Patented | Nov. 2, 1971 |
| [73] | Assignee | Texaco Inc.<br>New York, N.Y. |

[54] OIL RECOVERY PROCESS
11 Claims, 1 Drawing Fig.

[52] U.S. Cl. .................................................. 166/274
[51] Int. Cl. ..............................................E21b 43/16, E21b 43/18
[50] Field of Search ....................................... 166/274, 273, 275, 268, 252

[56] References Cited
UNITED STATES PATENTS

| 2,609,051 | 9/1952 | Brownscombe | 166/274 |
|---|---|---|---|
| 2,724,437 | 11/1955 | Whorton et al. | 166/268 |
| 2,724,438 | 11/1955 | Whorton et al. | 166/252 |
| 2,754,911 | 7/1956 | Spearow | 166/268 |
| 2,880,801 | 4/1959 | Crump | 166/274 X |
| 3,121,461 | 2/1964 | Sharp | 166/273 |
| 3,157,230 | 11/1964 | Connally, Jr. et al. | 166/274 |
| 3,256,933 | 6/1966 | Murphree et al. | 166/273 X |
| 3,268,000 | 8/1966 | Dumore | 166/274 X |
| 3,354,953 | 11/1967 | Morse | 166/274 X |

*Primary Examiner*—Stephen J. Novosad
*Attorneys*—Thomas H. Whaley and Carl G. Ries ABSTRACT: A miscible flooding process for the recovery of oil from an oil-bearing reservoir in which a gaseous hydrocarbon solvent which is gaseous at reservoir conditions and which is capable of forming a zone having no discernible phase change with the reservoir oil, is injected into the reservoir via an injection well and which is thereafter followed by the injection of a dry gas to move the previously injected gaseous hydrocarbon solvent through the reservoir thereby displacing the oil of the reservoir to a production well from which it is produced.

Ternary diagram at
Reservoir Temp. 167°F
Reservoir Pressure 2145 PSIA
for the System.
Gas (G)
Reservoir Oil (R)
Basic Solvent (S)

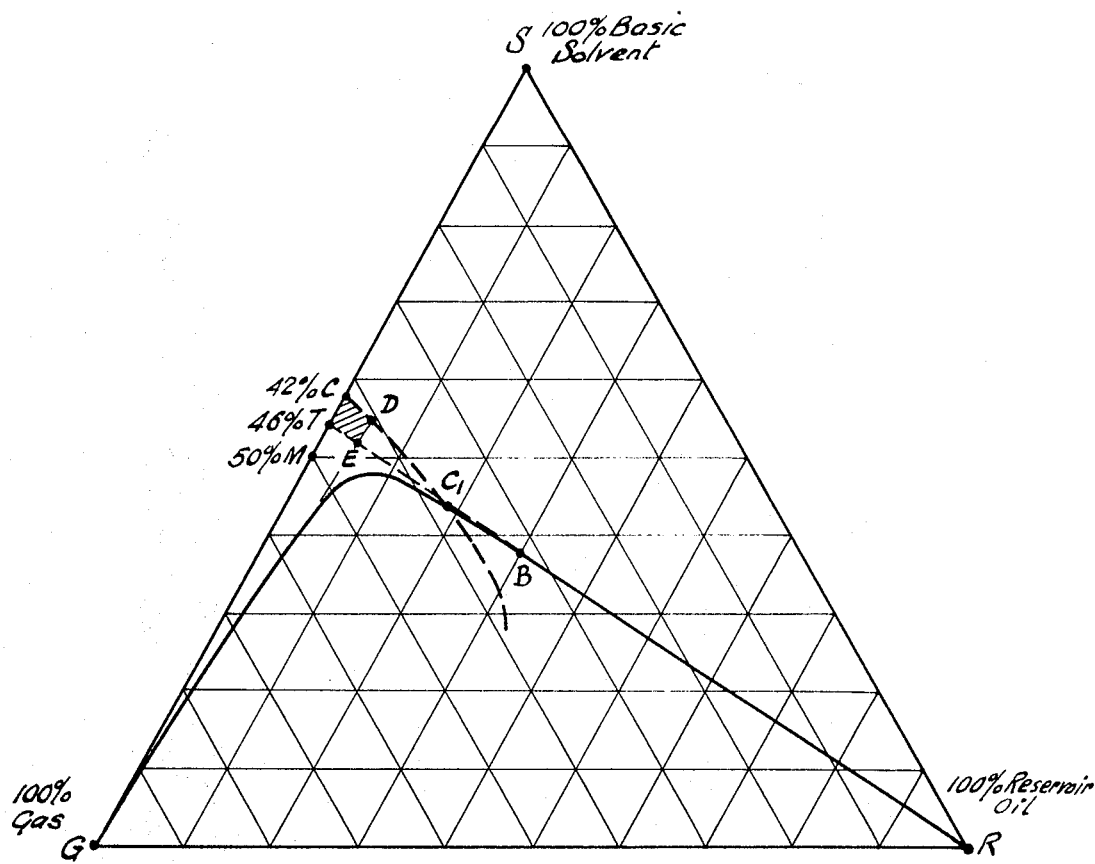

OIL RECOVERY PROCESS

FIELD OF THE INVENTION

This invention relates to a process for the recovery of oil from an underground reservoir containing oil by injecting thereinto a gaseous hydrocarbon solvent having a composition such that at the conditions of temperature and pressure of the reservoir the hydrocarbon solvent is gaseous and forms a zone having no discernible phase change with the oil of the reservoir, and thereafter injecting into said reservoir a dry gas to move the gaseous hydrocarbon solvent through the formation thereby displacing the reservoir oil.

DESCRIPTION OF THE PRIOR ART

In the recovery of oil from an underground reservoir one method that has been suggested for improving oil recovery is that of miscible flooding wherein a solvent is injected into the reservoir to push and wash out the oil of the reservoir. When solvents are employed which can mix completely with the oil, the term "miscible flooding" is applied to the process.

The process of miscible flooding is extremely effective in stripping and displacing the reservoir oil from the reservoir through which the solvent flows. This effectiveness is from fact that a two-phase system within the reservoir and between the solvent and the reservoir oil is eliminated at the conditions of temperature and pressure of the reservoir, thereby eliminating the retentive forces of capillarity and interfacial tension which are significant factors in reducing the recovery efficiency of oil in conventional flooding operations where the displacing agent and the reservoir oil exist as two phases in the reservoir.

One of the principal problems that occurs in the application of miscible flooding is how to best utilize the solvent injected, since the cost of the solvent may be several times the cost of the reservoir oil to be recovered. One technique that has been used is reclamation and recycling of the solvent as, for example, is done in the L.P.G-recycling process.

Another technique that is used employs a slug of a solvent which is capable of mixing completely with the reservoir oil, i.e. one which is miscible with the oil, and which is thereafter displaced through the reservoir by a driving agent subsequently injected. Combinations of these two techniques are also used.

A later development in the miscible slug process employs a driving agent that is miscible with the solvent slug at the conditions of temperature and pressure of the reservoir. In the operation of this process, the solvent slug is capable of mixing completely with the reservoir oil, forming a transition zone at the leading edge of the solvent slug between the oil and the solvent in which miscibility exists between the solvent and the oil. Thereafter, a driving agent, such as a gaseous hydrocarbon composed principally of methane, is injected and a second transition zone is formed at the trailing edge of the solvent slug between the solvent and the driving agent wherein miscibility exists between the solvent and the driving agent. In the successful application of the miscible slug process, it is essential that miscibility be achieved and retained in the transition zones. Thus, it is possible to avoid the undesirable effects of the forces of capillarity and interfacial tension at both the leading edge and the trailing edge of the solvent slug, thereby effectively achieving complete displacement of the reservoir oil, and at the same time realizing the economic advantages of minimal use of the solvent.

In general, miscible slug processes for the recovery of oil use solvents for the slug which are normally liquid or are normally gaseous, but liquefiable at the conditions of temperature and pressure of the reservoir. In the present invention an improved miscible recovery process is provided wherein the miscible slug is gaseous at conditions of temperature and pressure of the reservoir. The gaseous hydrocarbon slug forms an admixture with the reservoir oil and also forms an admixture with the displacing agent in both of which no phase change is discernible.

SUMMARY OF THE INVENTION

This invention relates to an improved miscible-flooding process for the recovery of oil from oil-bearing reservoirs, wherein a gaseous hydrocarbon solvent is injected into the reservoir which is gaseous at reservoir conditions and which is capable of mixing completely with the reservoir oil to form a zone having no discernible phase change at the reservoir conditions of temperature and pressure, and thereafter driving the gaseous hydrocarbon solvent by a dry gas which is capable of mixing completely with the gaseous hydrocarbon solvent previously injected to form a zone in which there is no discernible phase change, and thereby displacing the oil of the reservoir toward a production well from which it is produced.

BRIEF DESCRIPTION OF THE FIGURE

The accompanying ternary diagram illustrates a three-component composition diagram for a complex hydrocarbon system illustrative of this invention.

DESCRIPTION OF THE INVENTION

In its broadest aspect, the process of the present invention comprises first introducing into an oil-bearing reservoir a slug of a gaseous hydrocarbon solvent having a composition capable of forming a zone having no discernible phase change with the reservoir oil under the conditions of temperature and pressure of the reservoir, and thereafter introducing into the reservoir a dry gas as a displacing agent which is capable of forming a zone having no discernible phase change with the slug of gaseous hydrocarbon solvent and which moves the slug of solvent through the reservoir to a production well. By operating within the described manner, which will become apparent from the following discussion, zones are established and maintained at the leading edge of the slug between the injected gaseous hydrocarbon solvent and the oil and also at the trailing edge of the solvent between the gaseous hydrocarbon solvent and the dry gas which is the displacing agent wherein there exists no discernible phase change.

Under a given set of conditions of temperature and pressure for an oil bearing reservoir, reservoir, there exists a composition of gaseous hydrocarbon mixtures such that when combined with the reservoir oil, at the temperature and pressure of the reservoir, will form an admixture with the oil of a single fluid phase wherein no discernible phase change exists and the reservoir oil loses its identity. When this occurs the forces of capillarity and interfacial tension associated with the oil-bearing reservoir are reduced to zero, thereby releasing the oil in the matrices of the reservoir to the mixture of the single fluid phase. This phenomenon can be demonstrated by referring to the accompanying FIGURE. It should be pointed out that although the depiction of a complex hydrocarbon system such as is found in an oil-bearing reservoir is somewhat arbitrary, the graphical representation as seen in the accompanying figure is useful in explaining qualitatively the events that occur within the reservoir during the practice of this invention.

In the three-component composition diagram, often referred to as a ternary diagram, the three components are, (G) a gas, (S) a basic solvent, and (R) a reservoir oil, and are represented by the vertices of the triangle. The phase relations among the three components are depicted thereon for a given temperature and pressure. The accompanying ternary diagram, illustrates the process of this invention as applied to a reservoir wherein, for example, the reservoir temperature is 167° F. and its pressure is 2,145 p.s.i.a. For this specific example, the approximate compositions of the three components are given in the following table.

| Composition | (G) Gas | Basic (S) Solvent | (R) Reservoir Oil |
|---|---|---|---|
| $N_2$ | 2.4 | | 1.6 |
| $C_1$ | 68.1 | 1.1 | 31.0 |
| $C_2$ | 20.4 | 12.0 | 9.4 |
| $C_3$ | 8.0 | 56.1 | 7.8 |

| | | | |
|---|---|---|---|
| $C_4$ | 1.0 | 30.8 | 5.8 |
| $C_5$ | 0.1 | | 3.9 |
| $C_6+$ | | | 40.5 |

The sides of the triangle represent mixtures of the components connected by the respective sides of the triangle and may be referred to as pseudobinary mixtures. The composition of the components contained in the pseudobinary mixtures is given by the scale along the sides of the triangle and is in mol percent. A point within the triangle represents a composition containing all three components and its composition is determined by the appropriate mol percent values at the intersection of the point. Such a composition within the triangle may be homogeneous in one phase or heterogeneous in two phases. The curve G, $C_1$, R represents the phase envelope curve, and in the area within the phase envelope, two phases, viz, gas and liquid, exist, whereas compositions outside the phase envelope exist in only one phase. The curve C, $C_1$ represents the critical locus. The area encompassed by S, C, $C_1$, R contains compositions that are in the liquid phase, whereas the area enclosed by G, C, $C_1$, contains compositions that are in the gaseous phase. The term "gas" as used herein includes those gases that exhibit retrograde condensation on isothermal pressure decline. Retrograde condensation is defined as the appearance of a liquid phase in an apparently gaseous system upon the lowering of the pressure of the system.

Referring to the accompanying FIGURE, tests have determined that for the given components represented, a pseudobinary composition containing between 42 and 50 percent gas, i.e. between points C and M, is a gas that exhibits retrograde condensation.

A further concept of this invention can be shown by referring again to the accompanying FIGURE. If a binary composition is selected having 46 mol percent gas, which is represented in the accompanying diagram as point T, is added to the reservoir oil, vertex R, the composition of the resulting admixture will move along the line connecting T and R. Since this connecting line is tangent to the phase envelope at point B, it can be seen that at all times during the admixture, there will be a single phase present whose composition is shown by this line. If a mixture even slightly higher in percent of the gas component were added to the reservoir oil, it can be seen that the resulting composition between the selected mixture and the reservoir oil would cross the phase envelope curve, and two phases would exist. Thus, the composition having the leanest mol percent of the gas (viz, point T) that one can use as a gaseous hydrocarbon solvent and yet avoid having two phases is one having the composition as indicated by point T. Furthermore, the composition represented by point T is in the gaseous phase.

With this discussion, the essence of the invention becomes apparent, wherein a miscible flood is conducted by the injection of a gaseous hydrocarbon solvent having a preferred composition between point C and point T on the accompanying FIGURE. However, one can also see that the conditions of the invention can also be met if the gaseous hydrocarbon solvent contained a small percent of the reservoir oil, and is within the area on the accompanying FIGURE by C, T. D, E where line D, E is determined by the tangent to the phase envelope curve from point G which establishes the maximum limit for percent of reservoir oil that can be present in a gaseous hydrocarbon solvent and still remain outside the phase envelope curve. Thus, at all times during the injection of the gaseous hydrocarbon solvent, a transition zone exists in which there is no discernible phase change between the injected slug of gaseous hydrocarbon solvent and the reservoir oil.

After having established the slug and the transition zone between the slug and the reservoir oil within the reservoir, a dry gas is injected as the displacing agent, which is a gas at the reservoir conditions of pressure and temperature and is represented on the accompanying diagram as point G. Upon injection of the displacing agent, there is established a second transition zone between the trailing edge of the gaseous hydrocarbon solvent slug and the dry-gas-displacing agent, whose composition through the transition zone is represented by the portion of the side of the triangle in the accompanying figure between points T and G, wherein no discernible phase change exists.

The advantages of having a single fluid phase wherein no discernible phase change exists, throughout the displacement process viz, the elimination of forces of capillarity and interfacial tension that normally occur in a reservoir, would be realized thereby resulting in recovery of substantially all of the reservoir oil.

The method of the invention is workable at any pressure and temperature provided the aforementioned single fluid phase conditions are met. One preferred way to determine phase conditions is the use of static miscibility tests. For specific compositions of a given component system of a dry gas, reservoir oil and basic solvent material, a ternary diagram of the type shown in the accompanying FIGURE is constructed from the data obtained by the static miscibility tests, wherein single phase pressures are determined and are used to construct the phase envelope curve and the critical locus for the system of interest.

The compositions of the gaseous hydrocarbon solvent and the driving agent set forth hereinabove with respect to the practice of the invention as illustrated by the FIGURE are not limitive of this invention but merely illustrative thereof. Any suitable gaseous hydrocarbon mixture that fulfills the conditions for establishing and maintaining a requisite phase condition might be employed. The gaseous hydrocarbon solvent used may contain any number of hydrocarbon components, such as methane and other hydrocarbons having from two to six carbon atoms per molecule.

The displacing agent employed may be any gaseous material, that is gaseous at reservoir conditions, and therefore miscible with the gaseous hydrocarbon solvent. The preferred displacing agent is a dry, relatively inexpensive gas, such as a gas containing substantially methane, as natural gas or a gas from a gas-processing facility. Other gases, however, which may be employed include ethane, carbon dioxide, nitrogen, air and mixtures thereof. The displacing agent is injected in amounts sufficient to displace the gaseous hydrocarbon solvent through the reservoir and is injected at a rate so that the preferred rate of movement through the reservoir is from about 0.03 to about 10.0 feet per day.

In the application of this invention, the reservoir may be repressured, if required, by the injection of other fluids to establish at least saturated reservoir conditions prior to or during the injection of the gaseous hydrocarbon solvent slug. Fluids which may be used for repressuring include methane, natural gas, carbon dioxide, nitrogen, air, water and mixtures thereof.

It is within the scope of the invention to apply the process either as a horizontal displacement technique wherein the slug of the gaseous hydrocarbon solvent is established to form a circumferential ring expanding from the injection well as the process is continued, or it can be used in a vertical displacement wherein a blanket of the solvent is established prior to the injection of the displacing agent and which moves the blanket vertically through the reservoir.

In summary, in accordance with the practice of this invention, a miscible flood is carried out in the following manner. There is introduced into the reservoir a gaseous hydrocarbon solvent slug having a composition such that it is capable of forming with the reservoir oil, at the temperature and pressure thereof a zone in which no discernible phase change exists. After an amount sufficient to establish a slug of the gaseous hydrocarbon solvent has been injected, there is introduced into the formation a displacing agent, which is a dry gas which is capable of forming a zone having no discernible phase change with the gaseous hydrocarbon solvent at the conditions of temperature and pressure of the reservoir. The injection of the displacing agent is continued so as to move the fluids of the reservoir through the reservoir toward a production well from which the reservoir oil and the solvent can be produced. By operating in the above-indicated manner a substantially complete displacement of the reservoir oil is realized.

We claim:

1. A process for recovering oil from an oil-bearing reservoir, said reservoir being traversed at least by one injection well and at least one production well comprising the steps of repressuring said reservoir to at least its saturation pressure, thereafter injecting into said reservoir via said injection well a gaseous hydrocarbon solvent which is gaseous at reservoir temperature and pressure and has a composition with respect to said oil such that said gaseous hydrocarbon solvent is capable of admixing with said oil in said reservoir without a discernible phase change at reservoir temperature and pressure, and thereafter injecting into said reservoir a displacing gas which is gaseous at reservoir temperature and pressure and which has a composition with respect to said gaseous hydrocarbon solvent such that said displacing gas is capable of admixing with said gaseous hydrocarbon solvent without a discernible phase change at reservoir temperature and pressure, said gaseous hydrocarbon solvent being injected in amounts sufficient to form and maintain a first transition zone with said reservoir oil wherein there is no discernible phase change and a second transition zone with said displacing gas wherein there is no discernible phase change, and said displacing gas being thereafter injected at a pressure and in an amount sufficient to maintain said reservoir pressure and drive said transition zones and said oil toward said producing well from which they are produced.

2. The process of claim 1 wherein said gaseous hydrocarbon solvent comprises substantially methane and hydrocarbons having from two to six carbon atoms per molecule.

3. The process of claim 2 wherein said gaseous hydrocarbon solvent comprises substantially methane and propane.

4. The process of claim 1 wherein said dry gas is selected from the group consisting of methane, natural gas, ethane, carbon dioxide, nitrogen, air, and mixtures thereof.

5. The process of claim 1 wherein said reservoir is repressured at least to substantially its saturation pressure by the injection of a fluid selected from the group consisting of methane, natural gas, carbon dioxide, nitrogen, air, water and mixtures thereof.

6. In a process for recovering oil from an oil-bearing reservoir, said reservoir being traversed by at least one injection well and at least one production well comprising the steps of repressuring said reservoir to at least its saturation pressure, thereafter injecting into said reservoir via said injection well a gaseous hydrocarbon solvent, said solvent being gaseous at reservoir temperature and pressure and having a composition which is selected from those compositions indicated on a ternary composition diagram wherein gas, basic solvent material and reservoir oil are represented by the vertices of said ternary diagram and said composition of said gaseous hydrocarbon solvent falls along the side of said ternary diagram indicating the composition of said gas and said solvent material in the range between the intersection of the critical locus with said side of said ternary diagram and the intersection of the tangent to the phase envelope of said triangle extending from the reservoir oil composition vertex of said ternary diagram to said side of said ternary diagram indicating the composition of said gas with said basic solvent material wherein injection of said gaseous hydrocarbon solvent is in an amount sufficient to establish and maintain a slug of said gaseous hydrocarbon solvent within said reservoir and thereafter introducing into said reservoir a displacing agent substantially comprising said gas thereby displacing said solvent and effecting substantially complete displacement of said oil through said reservoir to said production well from which said oil is recovered.

7. The process of claim 6 wherein said gaseous hydrocarbon solvent comprises substantially methane and hydrocarbons having from two to six carbon atoms per molecule.

8. The process of claim 7 wherein said gaseous hydrocarbon solvent comprises substantially methane and propane.

9. The process of claim 6 wherein said displacing agent is selected from the group consisting of methane, natural gas, ethane, carbon dioxide, nitrogen, air, and mixtures thereof.

10. The process of claim 6 wherein said gaseous hydrocarbon solvent contains reservoir oil in amounts such that said gaseous hydrocarbon solvent exists as a single gaseous phase at the reservoir condition of temperature and pressure.

11. The process of claim 6 wherein said reservoir is repressured at least to substantially its saturation pressure by the injection of a fluid selected from the group consisting of methane, natural gas, carbon dioxide, nitrogen, air, water, and mixtures thereof.